(12) United States Patent
Portier et al.

(10) Patent No.: US 9,397,749 B2
(45) Date of Patent: **\*Jul. 19, 2016**

(54) METHOD AND APPARATUS FOR PERFORMING AN AUTOMATIC POWER ADJUSTMENT FOR AN OPTICAL SIGNAL

(71) Applicant: ADVA Optical Networking SE, Meiningen OT Dreissigacker (DE)

(72) Inventors: J. David Portier, Buford, GA (US); Sorin Tibuleac, Johns Creek, GA (US)

(73) Assignee: ADVA OPTICAL NETWORKING SE, Meiningen OT Dreissigacker (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/014,316

(22) Filed: Aug. 29, 2013

(65) Prior Publication Data
US 2014/0003809 A1 Jan. 2, 2014

Related U.S. Application Data

(63) Continuation of application No. 12/887,245, filed on Sep. 21, 2010, now Pat. No. 8,620,156.

(51) Int. Cl.
*H04B 10/035* (2013.01)
*H04B 10/077* (2013.01)
(Continued)

(52) U.S. Cl.
CPC ........ *H04B 10/07955* (2013.01); *H04B 10/035* (2013.01); *H04B 10/0775* (2013.01); *H04B 10/2942* (2013.01); *H04J 14/0221* (2013.01); *H04J 14/0276* (2013.01); *H04J 14/0201* (2013.01); *H04J 14/0206* (2013.01); *H04J 14/0283* (2013.01)

(58) Field of Classification Search
CPC ............... H04B 10/073; H04B 10/075; H04B 10/0775; H04B 10/0777; H04B 10/0779; H04B 10/0799; H04B 10/07955; H04B 10/564; H04J 14/0221
USPC ........... 398/9, 10, 16, 17, 20, 21, 30–33, 136, 398/158, 38, 94, 197, 83
See application file for complete search history.

(56) References Cited

U.S. PATENT DOCUMENTS 5,225,922 A * 7/1993 Chraplyvy et al. ............. 398/94
6,439,777 B1 * 8/2002 Harrison et al. ................ 385/53
(Continued)

FOREIGN PATENT DOCUMENTS

EP          1439646 A2 *  7/2004
WO    WO 01/47151 A1    6/2001

OTHER PUBLICATIONS

Extended European Search Report for European Application No. 10195464.2 (Dec. 13, 2011).
(Continued)

*Primary Examiner* — Dalzid Singh
(74) *Attorney, Agent, or Firm* — Jenkins, Wilson, Taylor & Hunt, P.A.

(57) ABSTRACT

A method and apparatus for performing an automatic power adjustment wherein a signal power level of an optical signal transmitted by an optical transceiver via an optical span to a far-end device is adjusted automatically in response to a determined span loss of the optical span to achieve a predetermined desired receive signal power level of the optical signal at the far-end device.

10 Claims, 10 Drawing Sheets

(51) Int. Cl.
*H04B 10/079* (2013.01)
*H04B 10/294* (2013.01)
*H04J 14/02* (2006.01)

(56) References Cited

U.S. PATENT DOCUMENTS

| | | | |
|---|---|---|---|
| 7,038,841 B2* | 5/2006 | Chang et al. | 359/334 |
| 7,046,429 B2* | 5/2006 | Halevi et al. | 359/337.1 |
| 7,536,110 B2* | 5/2009 | Uda et al. | 398/177 |
| 8,189,180 B2* | 5/2012 | Bato et al. | 356/73.1 |
| 2003/0035203 A1* | 2/2003 | Shlifer | H01S 3/06758 359/337.1 |
| 2003/0174390 A1 | 9/2003 | Kakui | |
| 2003/0185563 A1 | 10/2003 | Stephens et al. | |
| 2004/0037564 A1* | 2/2004 | Halevi | H04B 10/2931 398/94 |
| 2004/0240040 A1 | 12/2004 | Tian et al. | |
| 2006/0044645 A1* | 3/2006 | Charlet | H04B 10/2931 359/333 |
| 2007/0041006 A1* | 2/2007 | Abbott | 356/73.1 |
| 2007/0230959 A1* | 10/2007 | Kamioka | H04B 10/506 398/79 |
| 2007/0291349 A1* | 12/2007 | Zhou | H01S 3/10015 359/333 |
| 2008/0170286 A1* | 7/2008 | Goto | 359/230 |
| 2009/0060498 A1* | 3/2009 | Libeskind et al. | 398/28 |
| 2009/0154918 A1* | 6/2009 | Hinderthuer | H04Q 11/0005 398/9 |
| 2010/0226644 A1 | 9/2010 | Ito et al. | |
| 2011/0020010 A1* | 1/2011 | Bruno et al. | 398/158 |

OTHER PUBLICATIONS

Notice of Allowance and Fee(s) Due for U.S. Appl. No. 12/887,245 (Aug. 21, 2013).
Final Office Action for U.S. Appl. No. 12/887,245 (May 13, 2013).
Non-Final Office Action for U.S. Appl. No. 12/887,245 (Nov. 21, 2012).
European Search Report for European Application No. 10 19 5464 (Dec. 6, 2011).
Communication pursuant to Article 94(3) EPC for European Application No. 10 195 464.2 (Jun. 1, 2015).

* cited by examiner

METHOD AND APPARATUS FOR PERFORMING AN AUTOMATIC POWER ADJUSTMENT FOR AN OPTICAL SIGNAL

PRIORITY CLAIM

This application is a continuation of U.S. patent application Ser. No. 12/887,245, filed Sep. 21, 2010, the disclosure of which is incorporated herein by reference in its entirety.

TECHNICAL BACKGROUND

The invention relates to a method and apparatus for performing an automatic power adjustment for an optical signal and in particular of an optical signal within a wavelength division multiplexing WDM optical network.

In wavelength division multiplexing WDM networks, multiple optical carrier signals are multiplexed on a single optical fiber by using different wavelengths (also called colours) of laser light to carry different signals. This increases data transmission capacity and enables bi-directional communication over the same strand of optical fibers. In wavelength divisional multiplexing optical networks, in particular in dense wavelength division multiplexing DWDM optical networks, it is desirable to attain a flat optical spectrum at the egress of each node of the network across all wavelengths. When a wavelength divisional multiplexing (WDM) optical network comprises fixed optical add/drop multiplexing (FOADM) nodes, balancing of optical powers for all wavelengths can be challenging. These FOADM nodes comprise fixed OADM filters that provide no power adjustment for power balancing. However, the transmitted optical power levels for the transponders and muxponders installed in such FOADM nodes can vary up to 10 dB, i.e. the transmit powers can vary from e.g. −3 dB to +7 dB. These power variations can be further increased by the different loss of the different filters used by the wavelengths on the multiplexing path.

Accordingly, in conventional wavelength divisional multiplexing (WDM) optical networks, balancing the optical spectrum for an optical add/drop multiplexing node typically requires a manual power adjustment by a user using fixed in-line signal attenuators and power measuring devices such as power meters and/or spectrum analyzers. This procedure of manual balancing the optical power levels is very cumbersome and time consuming and affects all users of the optical platform including customers, installers, and customer service engineers. Therefore, there is a need to provide a more manageable solution for balancing the optical power levels which avoid a manual power adjustment to balance the optical spectrum at an optical add/drop multiplexing node of an optical network.

SUMMARY OF THE INVENTION

The invention provides a method for performing an automatic power adjustment, wherein a signal power level of an optical signal transmitted by an optical transceiver via at least one optical span to a far-end device is adjusted automatically in response to a determined span loss to achieve a predetermined receive signal power level of the optical signal at the far-end device.

An optical span can be formed in a possible embodiment by a pair of fiber jumpers between devices at one location or the optical span can also be a pair of fibers between nodes at two different locations over a distance of several kilometers or miles.

In a possible embodiment of the method according to the present invention, at least one optical pilot signal is transmitted by said optical transceiver via a first fiber of said optical span towards the far-end device and looped back via a second fiber of said optical span to said optical transceiver which measures the signal power level of the looped back optical pilot signal received by said optical transceiver.

In a possible embodiment of the method according to the present invention, the span loss of said optical span is determined on the basis of a transmit signal power level of a transmitted optical pilot signal and on the basis of the measured received signal power level of the received looped back optical pilot signal.

In a possible embodiment of the method according to the present invention, the optical pilot signal is looped back by a signal loop back unit being formed by loop adapter connected to said optical span at the side of the far-end device or being plugged into the far-end device.

In a possible embodiment of the method according to the present invention, the span loss is determined by comparing a measured signal power level of an optical data signal received by the optical transceiver via a fiber of the optical span from said far-end device with a predetermined desired receive signal power level.

In a possible embodiment, the far-end device is an optical transceiver and at least one communication channel is established via said optical span between both optical transceivers.

The optical transceivers can be pluggable devices which can be plugged in the near-end device and the far-end device.

In a possible embodiment of the method according to the present invention, each of the optical transceivers performs steps of:
  measuring the signal power level of an optical data signal received by the optical transceiver from the other optical transceiver via the optical span,
  comparing the measured signal power level with a predetermined desired receive power level to calculate a difference between the measured receive power level and the desired receive power level, and
  transmitting a power adjustment message via the established communication channel to the other optical transceiver to adjust an attenuation or amplification of the signal power of the optical signal transmitted by the optical transceiver via the optical span to the other optical transceiver.

In a possible embodiment, the established communication channel is formed by an embedded communication channel.

In an alternative embodiment, the established communication channel is formed by an out of band communication channel.

In a possible embodiment of the method according to the present invention, the power adjustment message is transmitted periodically by the optical transceiver via the established communication channel to the other optical transceiver.

In a possible embodiment of the method according to the present invention, the signal power level of the optical signal is adjusted automatically such that it is balanced with signal power levels of other optical signals transmitted over the same optical span at different wavelengths.

In a possible embodiment of the method according to the present invention, the signal power level of the optical signal transmitted by the optical transceiver is adjusted automatically in real time to compensate changes of the transmission characteristics of the optical span.

The invention further provides an optical transceiver comprising at least one signal adjustment unit to adjust automatically a signal power level of an optical signal transmitted by said optical transceiver via at least one optical span to a far-end device in response to a determined span loss of said optical span to achieve a predetermined desired receive signal power level of the optical signal received by said far-end device.

The signal adjustment unit can be formed by a variable optical attenuator or a variable gain optical amplifier.

In a possible embodiment of the optical transceiver according to the present invention, the optical transceiver is a pluggable optical transceiver. This pluggable transceiver can be plugged into a near end device.

The near end device in which the pluggable optical transceiver is plugged into can comprise a transponder for a single client device or a muxponder for multiple client devices.

In a possible embodiment of the optical transceiver according to the present invention, the optical transceiver comprises a monitoring unit which is provided for monitoring at least one optical pilot signal transmitted by said optical transceiver via a first fiber of said optical span towards the far-end device and looped back via a second fiber of said optical span to said optical transceiver.

In the embodiment of the optical transceiver according to the present invention, the monitoring unit measures the received signal power level of the looped back optical pilot signal and determines the span loss of said optical span on the basis of the transmitted signal power of the transmitted optical pilot signal and on the basis of the measured receive signal power level of the received looped back optical pilot signal.

In an alternative embodiment of the optical transceiver according to the present invention, the optical transceiver comprises a monitoring unit which is provided to determine a span loss of said optical span by comparing a measured signal power level of an optical signal received by said optical transceiver via a fiber of said optical span from the far-end device with a predetermined desired receive signal power level.

In a possible embodiment of the optical transceiver according to the present invention, the far-end device comprises at least one multichannel multiplexing/demultiplexing unit comprising a predetermined number of channel ports each being connectable to an optical transceiver.

In a further embodiment of the optical transceiver according to the present invention, the optical transceiver comprises an integrated control unit generating a control signal to control the signal adjustment unit automatically in response to the determined span loss of said optical span.

In an alternative embodiment of the optical transceiver, the optical transceiver comprises an interface for receiving a control signal to control the signal adjustment unit automatically in response to the determined span loss of the optical span, wherein the received control signal is provided by a near end device to which the optical transceiver is directed connected.

The optical transceiver according to the present invention can be a pluggable optical transceiver which can be plugged into a transponder or a muxponder of a node in an optical network, in particular an optical WDM network. This node can comprise a multichannel multiplexing/demultiplexing unit having a predetermined number of channel ports each being connectable to an optical transceiver, according to the present invention, plugged into a transponder or a muxponder of the respective node. The transponder can be provided for a single client device such as a router or a switch and can be connected to an optical transceiver, according to the present invention, plugged into the respective client device and connected to a corresponding transceiver plugged into the transponder of the node. Each muxponder of the node can be provided for multiple client devices such as routers, switches etc. The node can be connected via an optical network to further nodes. In a possible embodiment, the node is connected to other nodes of the network in a ring structure. The node can be connected to other nodes in a network of any topology including linear, ring and mesh networks Accordingly, the present invention further provides an add/drop multiplexing node for an optical network comprising at least one network interface connected to a multichannel multiplexing/demultiplexing unit comprising a predetermined number of channel ports each being connected via an optical span to an optical transceiver having a signal adjustment unit to adjust automatically a signal power level of an optical signal transmitted by said optical transceiver towards the respective channel port to achieve a predetermined desired receive signal power level of the optical signal.

In the embodiment of the add/drop multiplexing node according to the present invention, the multichannel multiplexing/demultiplexing unit comprises a loop back unit to loop an optical pilot signal transmitted by said optical transceiver via a first fiber of said optical span to said channel port of said multiplexing/demultiplexing unit back to said optical transceiver via a second fiber of said optical span, wherein the optical transceiver determines the span loss of said optical span on the basis of the transmit signal power level of the transmitted optical pilot signal and on the basis of the looped back optical pilot signal.

In a possible embodiment of the add/drop multiplexing node according to the present invention, the node comprises a network west interface and a network east interface to connect said node to an optical network ring, wherein each network interface is connected to a multichannel multiplexing/demultiplexing unit having a predetermined number of channel ports.

The add/drop multiplexing node can also comprise more than two network interfaces, for example within a mesh network.

In a possible embodiment of the add/drop multiplexing node according to the present invention, the channel port of a multichannel multiplexing/demultiplexing unit is either connectable to a channel port of the other multichannel multiplexing/demultiplexing unit to form a pass through channel or to a transponder of a single client device or to a muxponder for multiple client devices.

BRIEF DESCRIPTION OF THE ENCLOSED FIGURES

In the following, possible embodiments of the method and apparatus for performing an automatic power adjustment are described with reference to the enclosed figures.

DETAILED DESCRIPTION OF POSSIBLE EMBODIMENTS

Figure 1A:
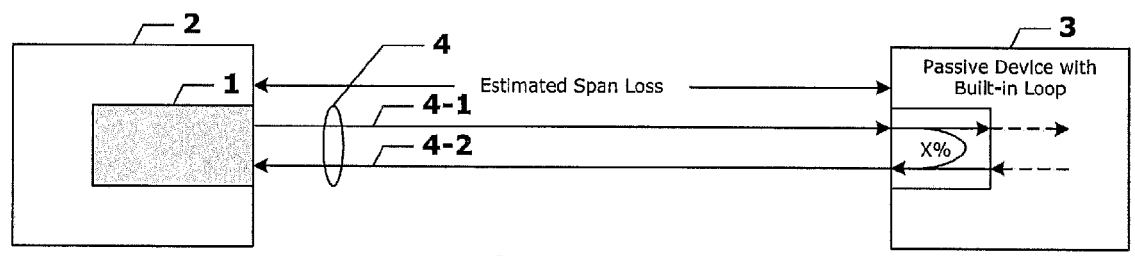
FIGS. 1A, 1B show diagrams to illustrate a method and apparatus performing an automatic power adjustment in a single ended operation according to a possible embodiment of the present invention.
Figure 1B:
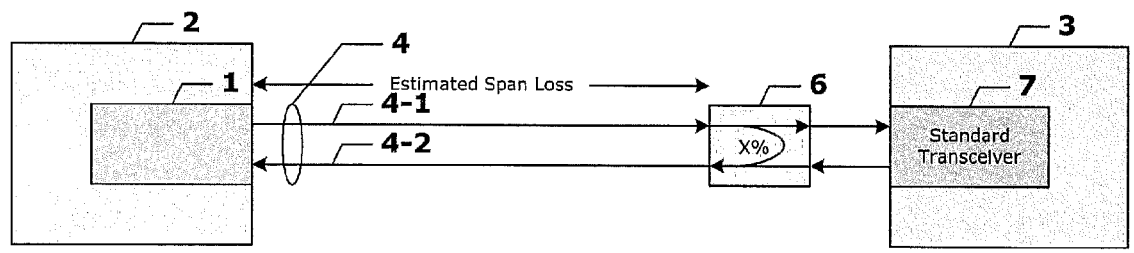

As can be seen from FIGS. 1A, 1B, an optical transceiver 1 according to the present invention can, in a possible embodiment, be plugged into a near end-device 2. In the embodiment shown in FIGS. 1A, 1B a looped back optical signal is used for power adjustment. The near end-device 2 can be, for example, a transponder for a single client device or a muxponder for multiple client devices. The near-end device 2 can for example be also a router, a switch or any other device that can house the optical transceiver 1. Such a transponder or muxponder 2 can form part of an add/drop multiplexing node within an optical network. The pluggable optical transceiver 1 shown in FIG. 1A is connected via an optical span 4 of a far-end device 3. The optical span 4 can comprise optical fibers for transmitting an optical signal. In the exemplary embodiment shown in FIG. 1A, the far-end device 3 is a passive device with a built-in or integrated unit which can loop back a certain percentage of the optical signal received by the far-end device 3 from the optical transceiver 1 via the optical span 4.

In a possible embodiment, the optical span 4 comprises two optical fibers 4-1, 4-2 and the integrated loop back unit 5 loops a certain percentage of the optical signal received by the far-end device 3 over the first optical fiber 4-1 via the second optical fiber 4-2 back to the optical transceiver 1.

The optical transceiver 1, according to the present invention, comprises a signal adjustment unit which is adapted to adjust automatically a signal power level of the optical signal transmitted by the optical transceiver 1 via the optical span 4 to the far-end device 3 in response to a determined span loss of the optical span to achieve a predetermined desired receive signal power level of the optical signal received by the far-end device 3. In a possible embodiment, the signal adjustment unit integrated in the optical transceiver 1 is a variable optical attenuator. In an alternative embodiment, the signal adjustment unit integrated in the optical transceiver 1 is a variable gain optical amplifier. In the embodiment of FIG. 1A, the loop back unit 5 is integrated in the far-end device 3.

In an alternative embodiment as shown in FIG. 1B, the loop back unit is integrated in a separate loop back adapter 6. The loop back adapter 6 can be connected in the vicinity of the far-end device 3 to the optical span and can comprise an interface of a standard transceiver 7 of the far-end device 3. The far-end device 3 can also be formed by a transponder or muxponder for one or several client devices.

In a preferred embodiment, the optical transceiver 1 transmits at least one optical pilot signal via the first fiber 4-1 of said optical span 4 towards the far-end device 3 wherein the optical pilot signal is looped back via the second fiber 4-2 of said optical span 4 to the optical transceiver 1. The optical transceiver 1 measures the signal power level of the looped back optical pilot signal received by the optical transceiver 1. The span loss of the optical span 4 is determined by the optical transceiver 1 on the basis of the transmit signal power level of the transmitted optical pilot signal transmitted via the first fiber 4-1 and on the basis of the measured receive signal power level of the received looped back optical pilot signal received via the second fiber 4-2. The optical pilot signal is looped back by the signal loop back unit which is either formed by a loop adapter 6 as shown in FIG. 1B connected to the optical span 4 at the side of the far-end device 3 or being plugged into the far-end device 3 or integrated into the far-end device 3 as shown in FIG. 1A. As for the single ended operation as shown in the variants of FIGS. 1A, 1B, the span loss of the optical span 4 can be calculated as follows:

$$\text{Power}_{Rx(Near\text{-}End)} = \text{Power}_{Tx(Near\text{-}End)} - (2 \times \text{(Estimated Span Loss)} + 10 \log 0.0x) \text{ in dB},$$

wherein $\text{Power}_{Rx(Near\text{-}End)}$ is the signal power of the optical pilot signal received by the transceiver 1, $\text{Power}_{Tx(Near\text{-}End)}$ the signal power of the optical pilot signal transmitted by the transceiver 1, estimated span loss is the determined span loss of the optical span 4, and x the percentage of power looped back by loop back unit 5 or the loop back adapter 6 to the transceiver 1.

The span loss of the optical span 4 is therefore given by:

$$\text{Estimated Span Loss} = \frac{\text{Power}_{Tx(Near\text{-}End)} - \text{Power}_{Rx(Near\text{-}End)} - 10\log 0.0x}{2} \text{ in dB}$$

With a predetermined desired receive power at the far-end device 3, e.g. the desired power received at the x % loop back unit, an attenuation of a variable optical attenuator integrated in the transceiver 1 can be calculated as follows:

$$\text{Attenuation}_{voa} = \text{Power}_{Tx(Near\text{-}End)} = \text{EstimatedSpanLoss} - \text{Power}_{Rx(Far\text{-}End\text{-}Desired)} \text{in dB}$$

The single ended operation for performing an automatic power adjustment in an optical transceiver 1 according to the present invention is correct if the span losses for both fibers 4-1, 4-2 between the near end and the far-end devices are the same. This is true for most applications, because the optical fibers 4-1, 4-2 are arranged within the same strand of optical fibers and undergo the same external influences.

Figure 2:
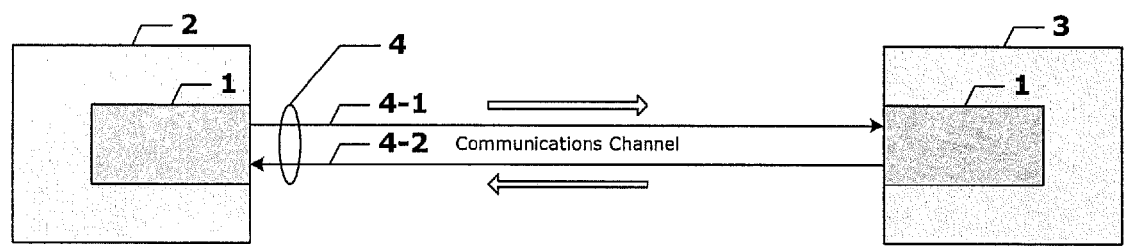
FIG. 2 shows a diagram to illustrate a method and apparatus for performing an automatic power adjustment in a dual-ended operation according to a further possible embodiment of the present invention.

FIG. 2 shows a diagram for illustrating a further possible embodiment of a method and apparatus for performing an automatic power adjustment according to the present invention. In the embodiment shown in FIG. 2 a communication channel is used for power adjustment. In the embodiment shown in FIG. 1, the devices 2, 3, i.e. the near end device 2 as well as the far-end device 3, comprise an optical transceiver 1 according to the present invention. The optical transceivers 1-1 and 1-2 can be pluggable transceivers plugged into the respective devices 2, 3. In this embodiment, the receiver calculates the difference between the received power and the desired received power and sends a message to the other transceiver to adjust the transmit power level by that amount.

In the embodiment shown in FIG. 2, a communication channel can be established via the optical span 4 between both pluggable optical transceivers 1-1, 1-2. A communication channel can be formed by an embedded communication channel ECC or by an out of band communication channel. In the embodiment shown in FIG. 2, the optical transceiver 1-1 can perform the following steps. In a first step, the signal power level of an optical signal received by the optical transceiver 1-1 from the other optical transceiver 1-2 via the optical span 4 is measured an integrated measuring unit of the near end optical transceiver 1-1. In a further step, the measured power level is compared with a predetermined desired receive power level to calculate a difference between the measured received power level and the desired received power level which can be performed by a calculation unit integrated in the near end optical transceiver 1-1. In a further step, the near end optical transceiver 1-1 transmits a power adjustment message via the established communication channel to the other optical transceiver 1-2 to adjust an attenuation or an amplification of the signal power of the optical signal transmitted by the far end optical transceiver 1-2 via the optical span 4 to the near end optical transceiver 1-1. The power adjustment message can be transmitted, in a possible embodiment, periodically by the optical transceiver via the established communication channel to the other optical transceiver.

An advantage of the dual ended operation for performing power adjustment as shown in FIG. 2 over the single ended operation as shown in connection with FIGS. 1A, 1B is that in band cross-talk can be avoided. For the single ended operation, as shown in FIGS. 1A, 1B, a fraction of the signal being looped back at the far-end device 2 towards the transceiver 1 of the near end device 2 may constitute in band crosstalk for the transceiver 1 of the far end device 3 in the direction towards the transceiver 1 of the near end device 2. The magnitude of this cross-talk depends on the power levels of the transmitters on both ends of the link, on the span loss in both directions, and on the fraction of the signal being looped back through a splitter/coupler combination of the far-end device. A high cross-talk value can degrade a signal performance. On the other hand, reducing the amount of looped back signal through selection of a higher ratio of the splitter/coupler pair can reduce the signal power of the optical pilot signal below an acceptable limit for a reliable operation. Accordingly, in the embodiment shown in FIGS. 1A, 1B, an optimum signal power for both ends of the link is required to achieve a low cross-talk penalty and a valid optical pilot signal at the same time. This is difficult to achieve with fixed power transmitters and the use of external attenuators. With the optical transceiver, according to the present invention, having an integrated signal adjustment unit such as a variable optical attenuator or a variable gain optical amplifier, a desired balance between low cross-talk and sufficient optical pilot tone signal power can be achieved. An advantage of the embodiment shown in FIGS. 1A, 1B resides in the fact that no separate communication channel between the optical transceivers has to be established.

In both embodiments in FIGS. 1A, 1B (Single-Ended-Operation) and FIG. 2 (Dual-Ended Operation), the signal power level of the optical signal is adjusted automatically such that it is balanced with signal power levels of other optical signals transmitted over the same optical span 4 at different wavelengths. Furthermore, the signal power level of an optical signal transmitted by the optical transceiver 1 can be adjusted automatically in real time to compensate changes of the transmission capability of the optical span 4. For example, if optical fibers of the optical span 4 are bent, the transmission capability of the span 4 is reduced. With the method and transceiver according to the present invention, the signal power level of the optical signal transmitted by the optical transceiver 1 is adjusted automatically in real time to compensate for the reduced transmission capability of the optical span 4 caused by bending the fibers.

Figure 10:
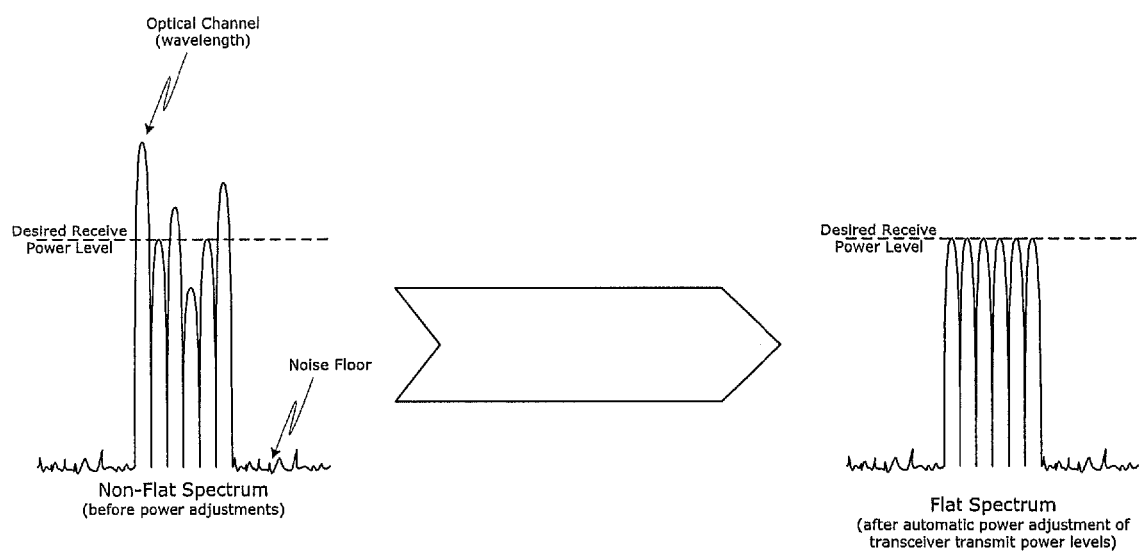
FIG. 10 shows a diagram to illustrate a process of equalizing a non-flat optical spectrum achieved by apparatus and a method for performing an automatic power adjustment according to the present invention.

In an optical network, it is desired to provide a flat optical spectrum. This is explained in connection with FIG. 10. The optical transceiver 1, according to the present invention, adapts its transmit power levels until a far-end transceiver receives a flat optimal power level spectrum. In a WDM optical network, there are transmitted signals via different optical channels each having a different wavelength $\lambda$. As can be seen in FIG. 10A, there can be different optical channels transmitting optical signals with different power levels. Some channels have a power level which is beyond a desired receive power level and other optical channels transmit optical signals having signal levels which do not achieve the desired receive power level at the receiving transceiver. With the method and transceiver according to the present invention, the near end transceiver adjusts its transmit power levels until a far-end transceiver receives the optimal power level as shown in FIG. 10B. Having all the wavelengths of the optical spectrum at the same power level helps to keep the power levels within acceptable limits and also helps to prevent signal degradation caused by the following impairments which can impact the signal performance with improper power levels at the receiver side. If the signal power level is low, the receiver noise is too high at the receiver. If the signal power is high, the receiver may saturate or become overpowered. If the signal power is low at the input of an optical amplifier, the optical signal noise ratio OSNR is low as the amplifier contributes amplified spontaneous emission ASE. If the signal power of the signal launched into a fiber span 4 is high, the optical signal can be distorted due to fiber non-linear effects. Similar effects can occur with high signal power levels, for example in Erbium doped fiber amplifiers or dispersion compensation fiber. A large difference in wavelengths powers between adjacent wavelengths $\lambda$ within an optical spectrum furthermore can generate cross-talk from the high power wavelength $\lambda_H$ to a low power wavelength $\lambda_h$. This kind of crosstalk can occur in optical filters or optical demultiplexing equipment. For a single ended optical transceiver which utilizes a percentage of the signal looped back towards the transceiver as shown in FIGS. 1A, 1B, a high level signal power can result in high levels of cross-talk since the percentage of the signal being transmitted from the near end transceiver is combined on the return signal path with the signal being transmitted from the far-end, i.e. the percentage of the signal transmitted from the near end transceiver becomes cross-talk for the far-end transmitted signal. A further advantage of having a flat signal spectrum having all wavelength equalized is that this helps with trouble shooting optical networks as a wavelength power level that is too low or is too high can be easily identified for an equalized spectrum versus an unequalized spectrum when viewing or monitoring the entire optical spectrum. Accordingly, with the method and apparatus according to the present invention, the automatic power adjustment is performed in a preferred embodiment for each optical channel or wavelength $\lambda$ to achieve a flat receive signal spectrum at the far-end device.

Figure 3:
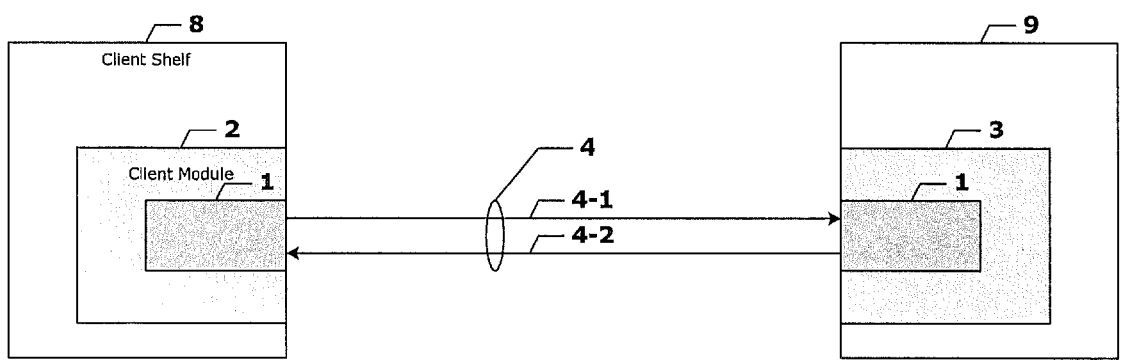
FIG. 3 shows a diagram to illustrate an apparatus and a method for performing an automatic power adjustment wherein one of the transceivers is provided in a client-connected device.
Figure 4:
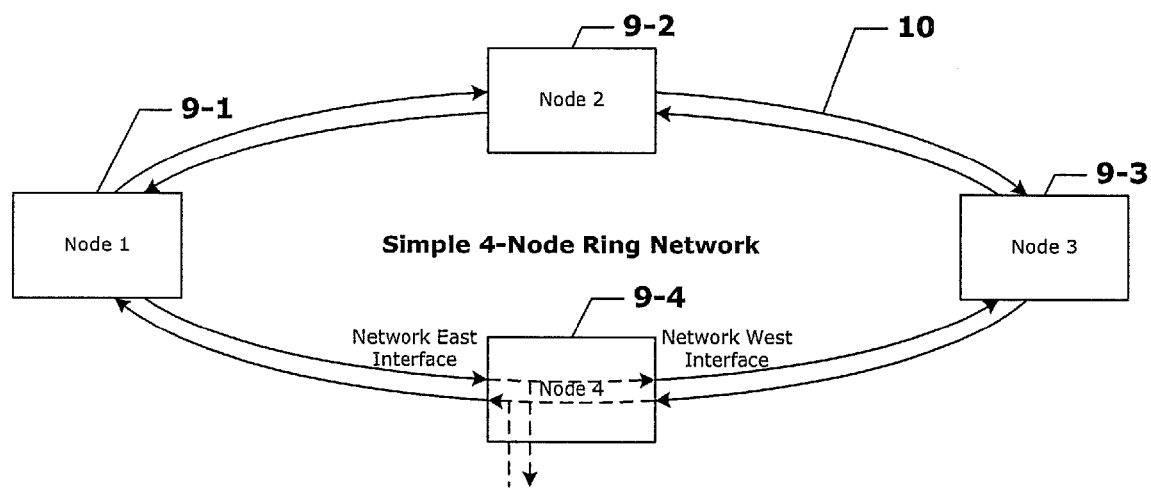
FIG. 4 shows an exemplary embodiment of an optical network comprising nodes each employing a method and apparatus for performing an automatic power adjustment according to the present invention.

FIG. 3 shows the use of an optical transceiver 1 according to the present invention wherein the optical transceiver 1 is placed in a router device. In this embodiment, the optical transceiver 1 is used in a point-to-point connection between a far-end device 3 and a near end device 2. The near-end device 3 can be, for example, a router module of a router 8. The far-end device 3 in the shown example can be a transponder or muxponder of an optical add/drop multiplexing node 9. The optical add/drop multiplexing node 9 can form a node of an optical network such as a DWDM optical network. FIG. 4 shows a diagram of an example for an optical network 10. In the shown embodiment, the optical network 10 is a node ring network wherein several nodes 1-8 are connected to each other in a ring structure and can perform an add/drop function for adding and dropping channels to/from devices connected to the respective node 1-8. In a possible embodiment, the nodes 9-1, 9-2, 9-3, 9-4 are connected with each other over long distance optical fibers wherein each optical node 9-$i$ comprises a network east interface and a network west interface at both sides for connecting to the next two node 9-($i$−1), 9-($i$+1) of the optical network 10. Each network interface can be connected via a corresponding optical fiber pair to a next node. In a possible embodiment as shown in FIG. 4, the optical network 10 comprises links between the nodes 9-$i$, each link comprising two optical fibers, wherein each optical fiber pair connects a network west interface of an optical node with a network east interface of the next optical node within the ring. The optical signal received by a node 8-$i$ within the optical network can either be dropped at the respective node or pass through to the next node within the ring. An optical signal generated by a device connected to the optical node 9-$i$ can be added to the network 10 by means of the node 9-$i$.

Figure 5:
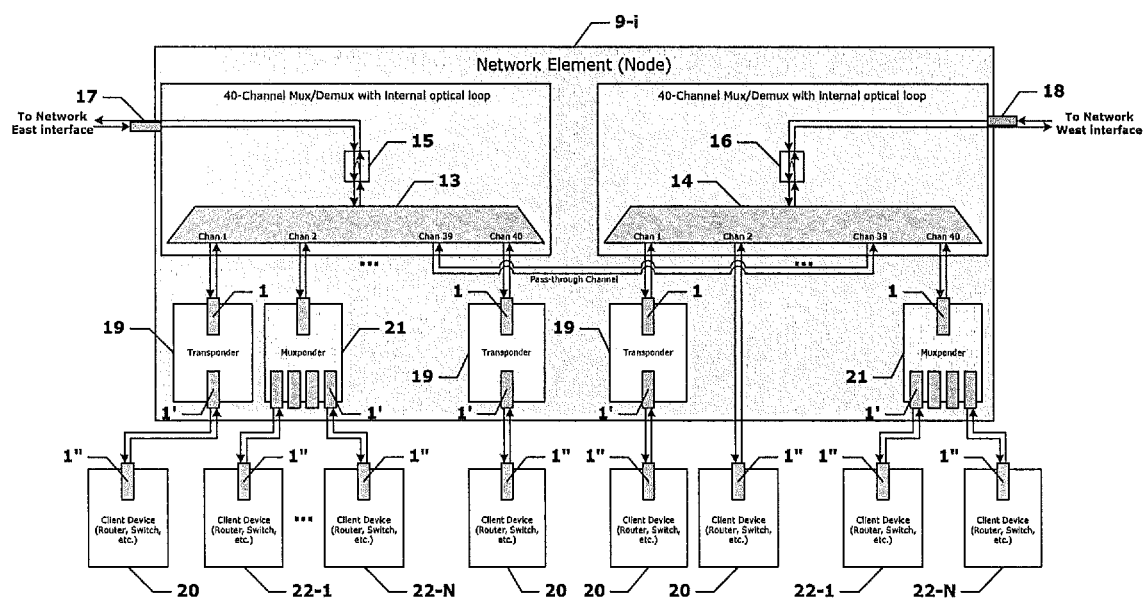
FIG. 5 shows a block diagram of a possible embodiment of a node within an optical ring network as shown in FIG. 4 employing the method and apparatus for performing an automatic power adjustment according to the present invention.

FIG. 5 shows a block diagram of a possible embodiment of an add/drop multiplexing node 9-$i$ for an optical network 10 according to the present invention.

As can be seen in FIG. 5, the optical network node 9-$i$ comprises a first network interface 11 and a second network interface 12. Both network interfaces 11, 12 are bidirectional interfaces and connect the network node 9-$i$ to the adjacent network nodes 9-($i$−1) and 9-($i$+1) within the optical network 10. The network interfaces 11, 12 are connected to a corresponding multichannel multiplexing/demultiplexing unit 13, 14 comprising a predetermined number of channel ports. In the embodiment shown in FIG. 5, both multichannel multiplexing/demultiplexing units comprise forty channel ports. Both multichannel multiplexing/demultiplexing units 13, 14 comprise an internal optical loop 15, 16 which can reflect a small percentage of an optical signal back towards an optical transceiver. Furthermore, both optical network interfaces 11, 12 can comprise an attenuator 17, 18. An external fixed attenuator 17, 18 may be installed to adjust pass-through wavelength power levels to locally added wavelengths power levels. In the example shown in FIG. 5, both ports 39 of the multichannel multiplexing/demultiplexing unit 13, 14 are connected with each other to form a pass through optical channel. By means of the attenuators 17, 18 it is possible to adjust the power level of the pass through wavelength of this channel to locally added wavelength power levels. In the exemplary embodiment in FIG. 5, some channel ports of the multiplexing/demultiplexing units 13, 14 are connected to transponders or muxponders of the optical node 9-$i$. In the embodiment shown in FIG. 5, the first channel port of the first multichannel multiplexing/demultiplexing unit 13 is connected to a transponder 19 provided for a single client device 20 connected to the network node 9-$i$. The client device 20 can for example be a router or a switch. Furthermore, in the exemplary embodiment of FIG. 5, the second channel of the first multichannel multiplexing/demultiplexing unit 13 is connected to a muxponder 21 provided for multiple client devices 22-1 to 22-N. In the exemplary embodiment, the last channel 40 of the first multiplexing/demultiplexing unit 13 is again connected to another transponder 19 of a further single client device 20. In the exemplary embodiment, the channels 1, 2 of the second multiplexing/demultiplexing unit 14 are connected by means of transponders 19 to single client devices 20. In the exemplary embodiment, the last channel 40 of the second multiplexing/demultiplexing unit 14 is connected via a muxponder 21 to client devices 22-1 to 22-N performing a group of client devices. In the example shown in FIG. 5, each multiplexing/demultiplexing unit 13, 14 comprises 40 channel ports. In alternative embodiments, the number of channel ports can be higher or lower. In the embodiment shown in FIG. 5, each muxponder 21 is connected to N=4 client devices. In an alternative embodiment, the number of client devices connectable to one muxponder 21 can vary.

As can be seen in FIG. 5 the muxponder 21 and the transponders 19 can comprise optical transceivers 1 according to the present invention. The optical transceivers 1 are connected to a channel port of a multiplexing/demultiplexing unit 13, 14. The optical transceiver 1 in a possible embodiment can be plugged into a corresponding transponder 19 or muxponder 21. The optical transceivers 1 comprise each a signal adjustment unit adapted to adjust automatically a signal power level of an optical signal transmitted by the respective optical transceiver 1 via an optical span towards the respective channel port of the multichannel multiplexing/demultiplexing unit 13, 14. In the exemplary embodiment shown in FIG. 5, the transmitting optical transceivers 1 comprise a monitoring unit for monitoring at least one optical pilot signal transmitted by the optical transceiver via a first fiber towards the multichannel multiplexing/demultiplexing unit 13, 14 and a looped back via a second fiber to the optical transceiver 1. In a possible embodiment, the monitoring unit measures the received signal power level of the looped back optical pilot signal and determines the span loss of the optical span on the basis of the transmitted signal power of the transmitted optical pilot signal and on the basis of the measured received signal power level of the received looped back optical pilot signal. In the embodiment shown in FIG. 5, the optical pilot signal transmitted by a transceiver is looped back by means of loop back units 15, 16 to reflect a small percentage of the optical signal back towards to the transmitting optical transceiver 1. In a possible alternate embodiment, the automatic adjustment of the signal power level is performed in response to a determined span loss of at least one optical span connecting the transceiver with a receiving transceiver.

An optical span can be formed by the optical connection between a transceiver 1 and the respective channel port of the multiplexing/demultiplexing unit 13, 14 (that may not contain the loop towards the transceiver) and a long distance optical span to a transceiver located in another node of the optical network. Accordingly, each optical transceiver 1 thus automatically adjusts a signal power level of an optical signal transmitted by the optical transceiver 1 towards the respective channel port corresponding to a determined span loss to achieve a predetermined desired receive signal power level of the optical signal received by a receiving transceiver within the same or another node. Consequently, different receiving transceivers receive the flat optical power spectrum as shown in FIG. 10B. Since each transponder and muxponder is connected to a multiplexer/demultiplexer, all other channels are filtered out. The flat spectrum is actually experienced on the fiber spans between nodes.

In a further embodiment as shown in FIG. 5, the optical transceivers 1 connecting the transponders 19 and the muxponders 21 to the channels of the multichannel multiplexing/demultiplexing units 13, 14 are adapted to operate in a single-ended mode as explained in more detail with reference to the embodiments shown in FIGS. 1A, 1B.

Each transponder 19 comprises further an optical transceiver 1' connecting the transponder 19 to a client device 20 such as a router or a switch. The client device 20 can comprise a plugged-in optical transceiver 1" being connected to the optical transceiver 1' of the transponder 19 via optical fibers. The client device 20 can also be connected directly by means of an optical transceiver 1" to a multiplexing/demultiplexing unit 13, 14 without going through a transponder or muxponder as illustrated also in FIG. 5. The optical transceivers 1', 1" can perform an automatic power adjustment according to the present invention. The optical transceiver 1' and 1" can operate in the shown embodiment in a dual-ended mode as explained in more detailed with reference to the embodiment shown in FIG. 2.

Figure 6:
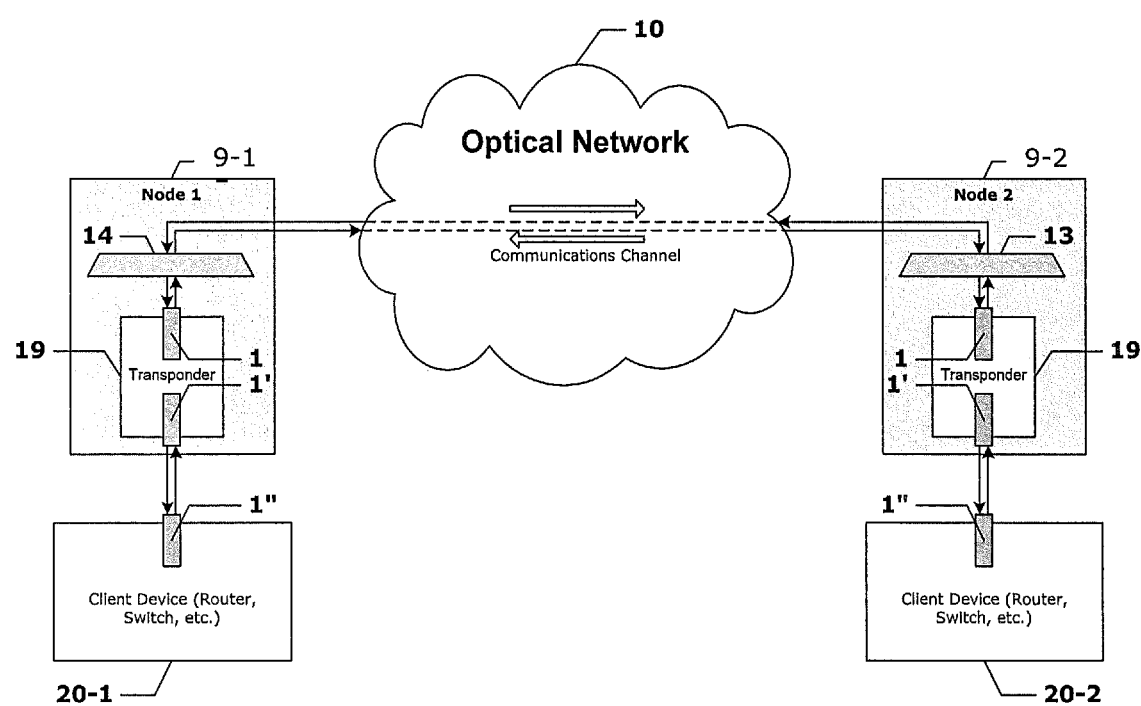
FIG. 6 illustrates a dual-ended operation for performing an automatic power adjustment according to the present invention over an optical network.

FIG. 6 shows a diagram for illustrating a dual-ended operation over an optical network using the method and transceiver for performing an automatic power adjustment according to the present invention.

In a first step, the transceiver 1 plugged into a transponder 19 of a first optical network node 9-1 turns on a light source such as a laser. The optical transceiver 1 transmits an optical signal via multiplexing/demultiplexing units 14 and the optical network 10 to a receiving optical network node 9-2 comprising also a transponder 19 with a plugged-in optical transceiver 1 for operating in a dual-ended node. The transceiver 1 within the receiving optical node 9-2 receives the optical signal and measures the power level of the received optical signal. The receiving optical transceiver 1 within the receiving node 9-2 calculates the difference between the received signal power level and a predetermined desired receive power level. The receiving optical transceiver 1 within the receiving node 9-2 then sends a message to the transmitting optical transceiver 1 within the transmitting node 9-1 indicating the required power adjustment over an established communication channel. The transceiver 1 within a transponder 19 of the first optical network node 9-1 receives message from the far-end optical network node 9-2 via the established communication channel. Then, a signal adjustment unit integrated in the sending optical transceiver 1 within the first optical node 9-1 adjusts automatically the transmitted power to optimize the far-end receive power level. This signal power adjustment can be performed by means of a variable optical attenuator (VOA) or by means of a variable gain optical amplifier. The receiving optical transceiver 1 within the second optical network 9-2 measures, in a further step, the received optical power level which corresponds to the desired optimal power level.

Figure 7:
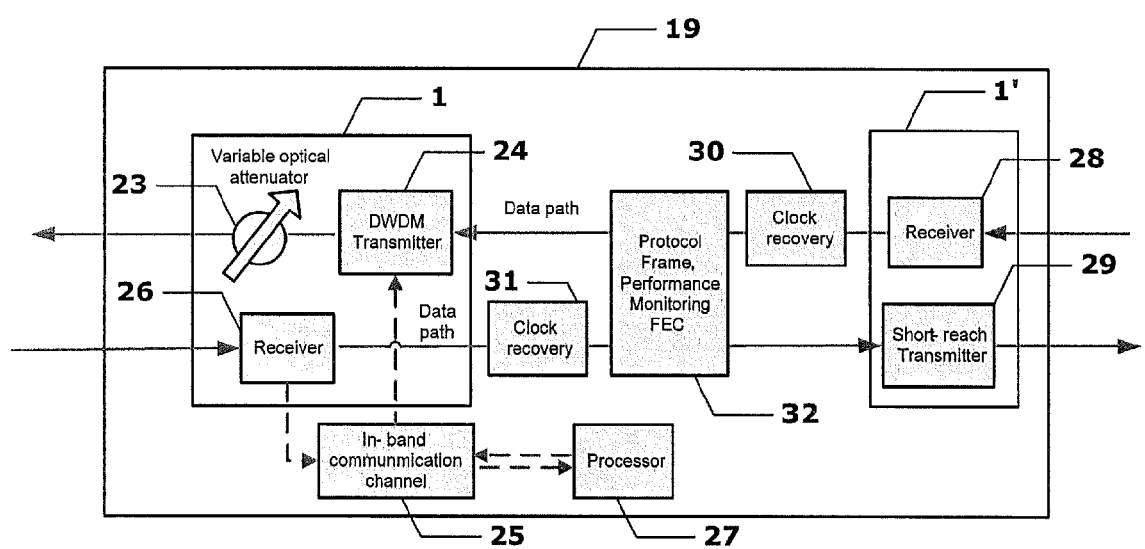
FIG. 7 shows a block diagram of a possible embodiment of an optical transceiver according to the present invention.

FIG. 7 shows a block diagram of a possible embodiment of a transponder 19 comprising a pluggable long-reached transceiver 1 and a pluggable short-reached transceiver 1'. In the shown embodiment the pluggable long-reached transceiver 1 comprises a signal adjustment unit 23 being formed by a variable optical attenuator. The variable optical attenuator 23 is adapted to adjust automatically a signal power level of an optical signal transmitted by said pluggable long-reached transceiver 1 via one or several optical spans to a far-end device which can be integrated in a far-end optical node of the optical network 10. This power level adjustment is performed in response to a determined span loss of one or several optical spans connecting the transmitting transceiver 1 and remote transceiver to achieve a predetermined desired receive signal power level of the optical signal received by the remote transceiver in the far-end device. The pluggable long-reach transceiver 1 further can comprise a DWDM transmitter 24 controlled by an in band communication channel control device 25. The pluggable long-reach transceiver 1 further comprises a receiver 26 to receive an optical signal from the remote transceiver of the far-end device. The communication channel can be formed by an embedded communication channel ECC or by an out of band communication channel. The communication channel is provided for transmitting a power adjustment message to the other remote optical transceiver and to receive a power adjustment message from the remote optical transceiver. This power adjustment message is received by the receiver 26 via the established communication channel and is extracted by the in band communication channel control unit 25 to be processed by a processor 27 of the transponder 19. In response to the received power adjustment message, the attenuation of the signal power of the optical data signal transmitted by the optical pluggable long-reach transceiver 1 is adjusted. In a possible embodiment, the processor 27 controls the variable optical attenuator 23 depending on the received power adjustment message.

The transponder 19 as shown in FIG. 7 can comprise a further pluggable short-reach transceiver 1' for connecting a client device 20 with the transponder 19. The pluggable short-reach transceiver 1' comprises a receiver 28 and a short-reach transmitter 29.

The transponder 19 can further comprise further data processing units for performing a processing of protocol frames or for performance monitoring and forward error correction. These processing units can be integrated into a processing unit 32 as shown in FIG. 7. For both signal paths of the transponder 19, a clock recovery circuit 30, 31 can be provided.

Figure 8:
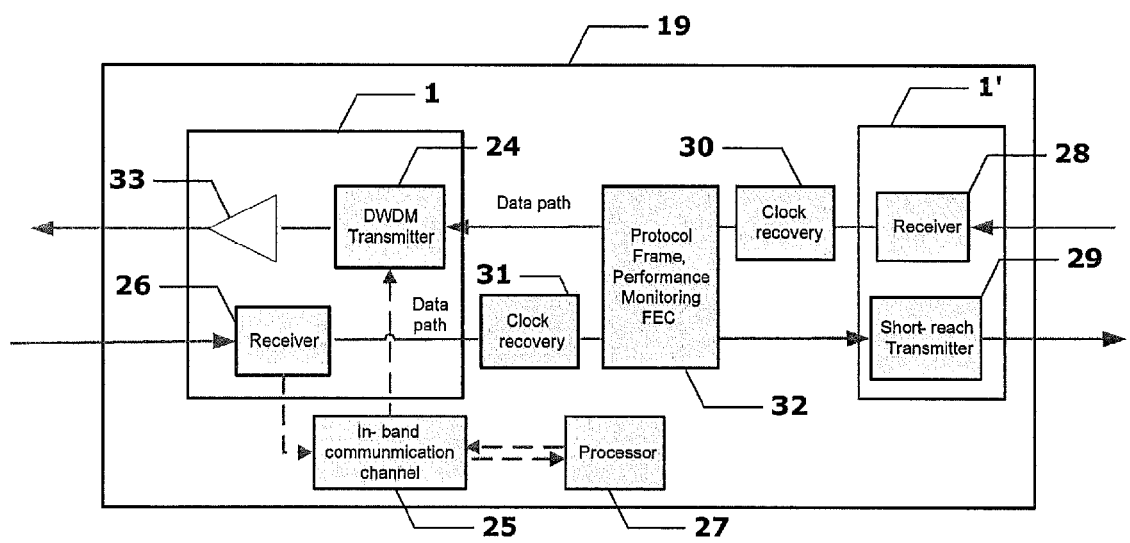
FIG. 8 shows a block diagram of a further possible embodiment of an optical transceiver according to the present invention.

FIG. 8 shows a further possible embodiment of a transponder 19 comprising a pluggable long-reach transceiver 1. In the shown embodiment, the pluggable long-reach transceiver 1 comprises a variable gain optical amplifier 33 instead of a variable optical attenuator.

Figure 9:
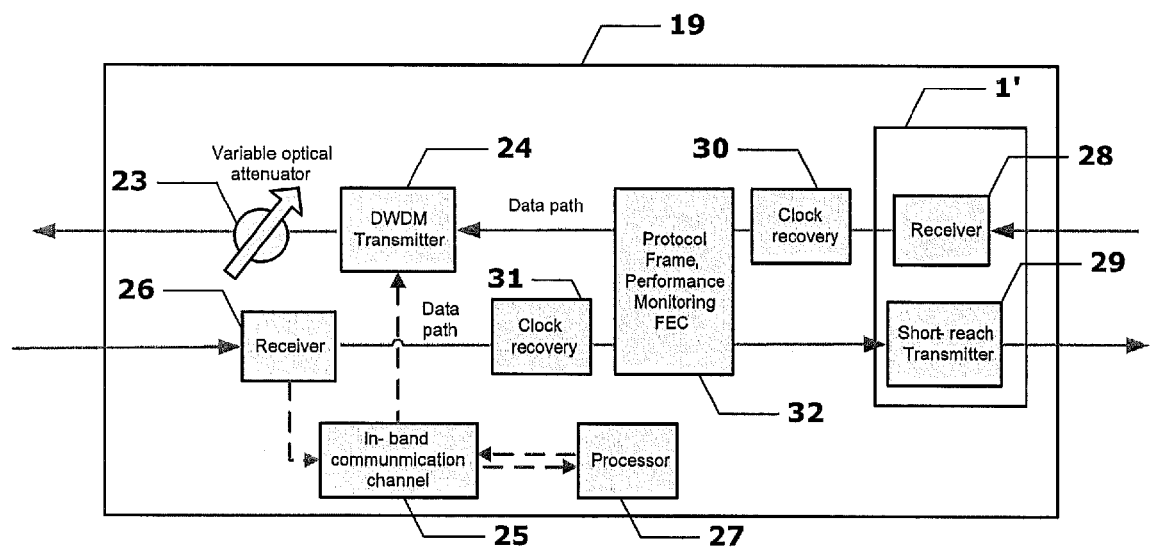
FIG. 9 shows a block diagram of a further possible embodiment of the transceiver according to the present invention.

FIG. 9 shows a block diagram of a further possible embodiment of an optical transponder 19. In the shown embodiment, the long-reach transceiver is not in the form of a plugged-in device but is integrated in the transponder 19. The optical transponder 19 comprises a long-reach interface consisting of discrete transmitter and receiver components and a variable optical attenuator 23. In the shown embodiment of FIG. 9, the short-reach transceiver 1' of the transponder 19 still forms a pluggable device.

What is claimed is:

1. A method for performing an automatic power adjustment of a signal power level of one optical channel transmitted by an optical transceiver, comprising:

automatically adjusting, in response to a determined span loss of at least one optical span, the signal power level of the one optical channel transmitted by the optical transceiver via the at least one optical span to a far-end device to achieve a predetermined desired receive signal power level of the optical channel at the far-end-device;

wherein said automatic adjusting is performed by said optical transceiver in real time to compensate for changes of the transmission capability of said optical span;

wherein the signal power level of the one optical channel is adjusted automatically such that the signal power level of the one optical channel is balanced with respect to signal power levels of other optical channels transmitted over the same optical span at different wavelengths, making the signal power levels have a substantially flat optical power spectrum;

wherein each optical channel is transmitted via a different wavelength;

wherein the span loss is determined by comparing a measured signal power level of an optical channel received by the optical transceiver via a fibre of said optical span from said far-end-device with a predetermined desired receive signal power level of the optical channel transmitted by said far-end-device;

wherein the far-end-device is an optical transceiver; and wherein at least one communication channel is established via said optical span between said optical transceiver and said far-end-device.

2. The method according to claim 1, wherein each of the optical transceivers performs the following steps:

measuring the power level of an optical channel received by the optical transceiver from the other optical transceiver via said optical span, comparing the measured signal power level with a predetermined desired receive power level to calculate a difference between the measured receive power level and the desired receive power level, transmitting a power adjustment message via the established communication channel to the other optical transceiver to adjust an attenuation or amplification of the power of the optical channel transmitted by the other optical transceiver via said optical span to the optical transceiver.

3. The method according to claim 1, wherein the established communication channel is formed by an embedded communication channel or by an out-of-band communication channel.

4. The method according to claim 2, wherein said power adjustment message is transmitted periodically by the optical transceiver via the established communication channel to the other optical transceiver.

5. An optical transceiver, comprising:

a signal adjustment unit adapted to adjust automatically a signal power level of one optical channel transmitted by said optical transceiver via at least one optical span to a far-end-device in response to a determined span loss to achieve a predetermined desired receive signal power level of the optical channel received by said far-end-device;

wherein said automatic adjusting is performed by said optical transceiver in real time to compensate for changes of the transmission capability of said optical span;

wherein the signal power level of the one optical channel is adjusted automatically such that the signal power level of the one optical channel is balanced with respect to signal power levels of other optical channels transmitted over the same optical span at different wavelengths;

wherein each optical channel is transmitted via a different wavelength;

wherein the span loss is determined by receiving by the optical transceiver via a fibre of said optical span from said far-end-device a result of comparing a measured signal power level of an optical channel with a predetermined desired receive signal power level; and wherein at least one communication channel is established via said optical span between said optical transceiver and said far-end-device.

6. The optical transceiver according to claim 5, wherein said signal adjustment unit is a variable optical attenuator or a variable gain optical amplifier.

7. The optical transceiver according to claim 5, wherein the far-end-device comprises at least one multi-channel multiplexing/demultiplexing unit comprising a predetermined number of channel ports each being connectable to an optical transceiver.

8. The optical transceiver according to claim 5, wherein the optical transceiver is a pluggable transceiver plugged into a near-end device comprising a transponder for a single client or a muxponder for multiple clients.

9. The optical transceiver according to claim 5, wherein said optical transceiver comprises an integrated control unit for generating a control signal to control the signal adjustment unit automatically in response to the determined span loss of said optical span or wherein said optical transceiver comprises an interface for receiving a control signal to control the signal adjustment unit automatically in response to the determined span loss of said optical span, said received control signal being provided by a near-end device to which the optical transceiver is connected.

10. An add/drop multiplexing node for an optical network comprising at least one network interface connected to a multichannel multiplexing/demultiplexing unit comprising:

a predetermined number of channel ports each being connected to an optical transceiver having a signal adjustment unit to adjust automatically a signal power level of one optical channel transmitted by said connected optical transceiver towards the respective channel port to achieve a predetermined desired receive signal power level of the optical channel received by the respective channel port of said multichannel multiplexing/demultiplexing unit;

wherein said automatic adjusting is performed by said connected optical transceiver in real time;

wherein the signal power level of the one optical channel is adjusted automatically such that the signal power level of the one optical channel is balanced with respect to signal power levels of other optical channels transmitted over the same optical span at different wavelength, making the signal power levels have a substantially flat optical power spectrum;

wherein each optical channel is transmitted via a different wavelength; and wherein at least one communication channel is established between the connected optical transceiver and the multichannel multiplexing/demultiplexing unit.

* * * * *